United States Patent
Ho et al.

(10) Patent No.: US 8,705,336 B2
(45) Date of Patent: Apr. 22, 2014

(54) DELAYED DATA FEEDING FOR INCREASED MEDIA ACCESS CONTROL PROCESSING TIME

(75) Inventors: Jin-Meng Ho, Plano, TX (US); Anuj Batra, Dallas, TX (US); Srinivas Lingam, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1892 days.

(21) Appl. No.: 11/537,384

(22) Filed: Sep. 29, 2006

(65) Prior Publication Data

US 2007/0127373 A1    Jun. 7, 2007

Related U.S. Application Data

(60) Provisional application No. 60/723,176, filed on Oct. 3, 2005.

(51) Int. Cl.
*H04J 9/00* (2006.01)
*H04L 12/28* (2006.01)

(52) U.S. Cl.
USPC ........... 370/208; 370/252; 370/338; 370/463; 370/474

(58) Field of Classification Search
None
See application file for complete search history.

(56) References Cited

U.S. PATENT DOCUMENTS

| | | | |
|---|---|---|---|
| 7,313,104 B1 * | 12/2007 | Kern et al. | 370/310 |
| 7,450,489 B2 * | 11/2008 | Sandhu | 370/204 |
| 7,554,966 B2 * | 6/2009 | Edwards et al. | 370/349 |

* cited by examiner

*Primary Examiner* — Steven H Nguyen
(74) *Attorney, Agent, or Firm* — Steven A. Shaw; Wade James Brady, III; Frederick J. Telecky, Jr.

(57) ABSTRACT

A system and method are provided that are operable for network communications that promote network devices to receive a transmit request, transmit a first part of a frame by a physical layer without a second part of the frame from a medium access control layer, and request the second part of the frame by the physical layer from the medium access control layer. These systems and methods also allow, in some embodiments, for the transmitting of the second part of the frame by the physical layer with data from the medium access control layer.

12 Claims, 5 Drawing Sheets

DELAYED DATA FEEDING FOR INCREASED MEDIA ACCESS CONTROL PROCESSING TIME

CROSS-REFERENCE TO RELATED APPLICATIONS

This application claims priority under 35 U.S.C. §119(e) to U.S. patent application Ser. No. 60/723,176 entitled "Delayed Data Feeding for Increased MAC Processing Time", filed on Oct. 3, 2005, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Next generation networks, such as WiMedia, increase the range, speed, and reliability of wireless data networks. One implementation of next generation networks utilizes ultra wideband (UWB) wireless technology. UWB wireless technology offers fantastic potential for bandwidth intensive multimedia applications. MultiBand OFDM physical layer (PHY) radio uses a sophisticated medium access control (MAC) layer that can deliver throughput up to 480 megabits per second (Mbps). This technology can be optimized for long range mobile multimedia applications. Additionally, the networks provide for fast device discovery and association so that devices can quickly and easily join and leave an ad-hoc network.

WiMedia refers to the UWB common radio platform that enables high-speed (480 Mbps and beyond), low power consumption data transfers in a wireless personal area network (WPAN). The WiMedia UWB common radio platform incorporates MAC layer and PHY layer specifications based on MultiBand orthogonal frequency-division multiplexing (MB-OFDM). WiMedia UWB is optimized for the personal computer (PC), consumer electronics (CE), mobile device and automotive market segments. ECMA-368 and ECMA-369 are international ISO-based specifications for the WiMedia UWB common radio platform.

SUMMARY

In one example embodiment, a system operable for network communication is disclosed which comprises a MAC layer and a physical layer. The physical layer is operable to transmit a first part of a response frame without information from the MAC layer; and the physical layer is further operable to transmit a second part of the response frame in response to receiving the second part of the response frame from the MAC layer.

In another example embodiment, a method for network communications is disclosed which comprises receiving a transmit request, transmitting a first part of a response by a physical layer without a second part of the response from a MAC layer and requesting the second part of the response from the MAC layer. This method also allows, in some embodiments, for the transmitting of the second part of the response by the physical layer with data from the MAC layer.

In yet another example embodiment, a MAC layer is able to communicate with a physical layer through an interface. In this embodiment a transmitter is operable to communicate with the physical layer and operable to communicate with a plurality of network devices. The transmitter is capable of receiving transmit requests from a plurality of network devices, passing the transmit request to the physical layer and the medium access control layer; and the physical layer is operable to transmit a first part of a response frame through the transmitter to a plurality of devices without information from the MAC layer.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

The present disclosure, in some embodiments, provides systems and methods for increasing the amount of time available to the medium access control layer (MAC) to provide portions of a response frame. In some embodiments, the physical layer (PHY) starts transmitting part of the response frame while the MAC continues data preparation for the remainder of the response frame. This approach decreases the interframe space value required by a device to make the transition from reception to transmission, and extends the time available to the MAC to prepare the response frame. This approach may be used in any wireless transmission, including, but not limited to WiMedia Ultra-Wideband (UWB) communication, WiMedia communication, or any other network communication using the MAC layer as disclosed herein. In addition, this method may also be used in wired communications, including, but not limited to IEEE 1394, Ethernet, and other wired communications.

Figure 1:
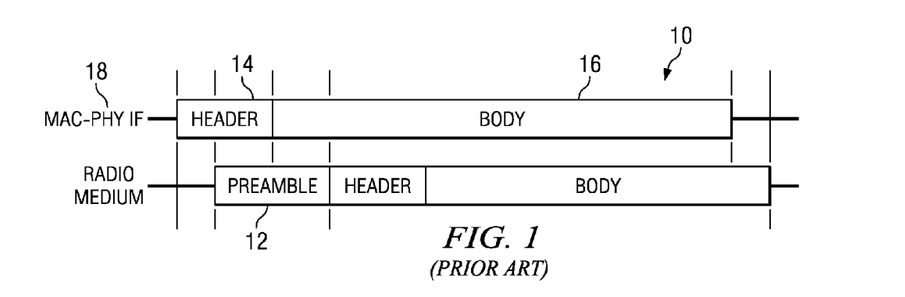
FIG. 1 is a prior art wireless data transmission chart.

FIG. 1 illustrates a prior art data transmission chart 10, showing a preamble 12, header 14, MAC payload 16, and MAC-PHY IF 18. In this example, the PHY requests data transmissions from the MAC prior to beginning transmitting a response frame. Header 14 and body 16 must be available to MAC-PHY interface (MAC-PHY IF) 18 prior to transmission of preamble 12.

Ecma International has published WiMedia standard ECMA-368 entitled High Rate Ultra Wideband PHY and MAC Standard, and ECMA-369 entitled MAC-PHY Interface for ECMA-368 which are hereby incorporated herein by reference as if reproduced in full, and can be utilized in conjunction with the present embodiments.

ECMA-369 First Edition published December 2005 describes burst mode as follows:

11.6.2 Burst Mode Transmission

A burst is defined as a MIFS separated sequence of frames (see 11.7.3). In burst transmission, the PHY ensures the accurate MIFS timing between frames. The preamble to be transmitted with each frame is defined by the rules summarized below:

BM shall be set to ONE for Burst Mode frame transmission.

...

11.7.3 Burst Mode Transmission Control

A burst is a sequence of MIFS separated frames transmitted from the same source. In burst mode transmission, the MAC has control over the timing of the first frame in the sequence of burst mode frames. The first frame is transmitted in exactly the same manner as a single frame transmission, as described in 11.7.2 except for the PLCP Header parameters listed in Table 14.

TABLE 14

Unique Burst Mode PLCP Header Parameters

| Parameter | Value | Comments |
|---|---|---|
| BM | ONE | Burst Mode must be set to ONE in the first frame of the burst mode sequence. |
| PT | ZERO | PT = 0 if the next frame will be sent using the Standard Preamble. |
|  | ONE | PT = ONE if the next frame will be sent using the Burst Preamble. |
| LENGTH | 1 . . . 4 095 | Number of Octets in MAC Frame Payload part of Frame. |

Figure 2:
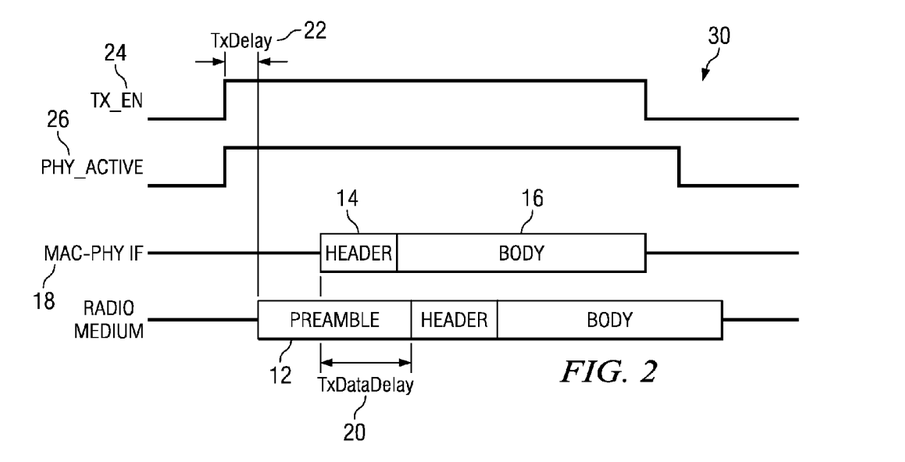
FIG. 2 is a wireless data transmission chart illustrating one embodiment of the present disclosure.

FIG. 2 illustrates one embodiment of a data transmission chart 30, which shows the use of a transmit delay (TxDelay) 22 interval and a transmit data delay (TxDataDelay) 20 in wireless data transmissions, and is based on the presently disclosed systems and methods. In this embodiment, while the MAC continues data preparation for the header 14 and body 16, the PHY starts transmitting preamble 12 of the response frame. The MAC is required to have the header ready for the PHY only within TxDataDelay 20 of the end of the preamble on the air. TxDataDelay 20 is the time interval from when the PHY is allowed to start requesting data from the MAC to when the transmission of the preamble ends over the air. In some embodiments, the PHY sending preamble 12 without data from the MAC can double the time the MAC has to assemble the header and body. By allowing the MAC to have more time to prepare for data transmission, architectural flexibility is increased as timing requirements are decreased. This method may be used in any time or data communication in which a MAC and PHY layer are present.

The present disclosure was the first to take advantage of the fact that due to layer partitioning, it is possible for devices with both a PHY and MAC to have the PHY transmit a preamble 12 without the immediate need for any information from the MAC. This provides the MAC additional time for data preparation that may be used in a myriad of different ways to increase flexibility and efficiency.

Figure 3:
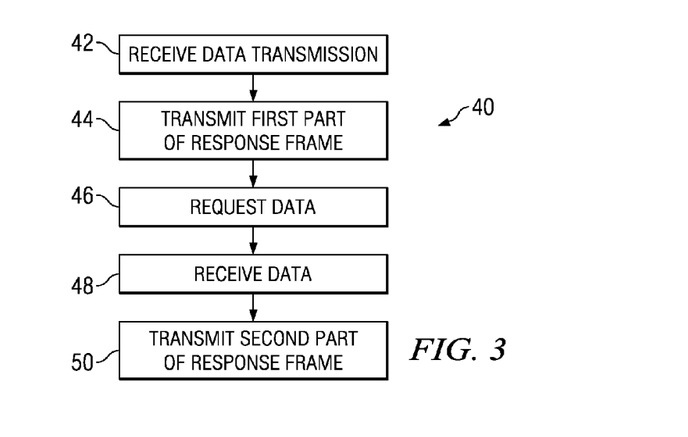
FIG. 3 is a flowchart of a data transmission as used in one embodiment of the present disclosure.

FIG. 3 is a flowchart 40 of one of the disclosed embodiments which is illustrated by FIG. 2. In this embodiment, the PHY layer receives a data transmission (Block 42). The PHY begins transmitting the first part of the response frame (Block 44) before requesting data from the MAC (Block 46). After receiving data from the MAC (Block 48), the PHY will transmit a second part of the data frame as data is received from MAC (Block 50). The preset disclosure enables the PHY to transmit data upon receiving an incoming data frame, without the immediate need for data from the MAC.

Figure 4:
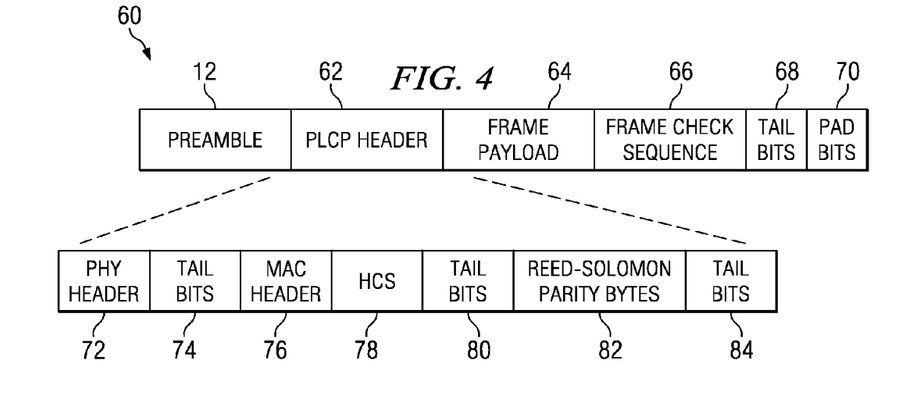
FIG. 4 is a block diagram of a data frame as used in one embodiment of the present disclosure.

FIG. 4 shows the structure of a PHY frame 60. Preamble 12, physical layer convergence procedure (PLCP) header 62, frame payload 64, frame sequence check 66, tail bits 68, and pad bits 70 are shown. PLCP header 62 contains information including MAC header 76 and PHY header 72 protected by header check sequence (HCS) 78, tail bits sets 74,80, and parity bits 82. Preamble 12 may be separated from the remainder of PHY frame 60 in the embodiment shown in FIG. 2. Thus it is possible for PLCP header 62 to be generated by the MAC simultaneously with the transmission of preamble 12 by the PHY, providing the MAC with additional time to prepare data for the PHY. PHY frame 60 may be considered having two parts: a preamble 12 portion and a remainder portion of PHY frame 60. It is envisioned that, in some embodiments, preamble 12 may be a generic section of the frame which always contains the same information. In these cases it is especially advantageous to program the transmit time for preamble 12 as soon as the MAC determines a need to send a frame, while giving the MAC more time to prepare PLCP header 62 and the rest of the remainder portion of PHY frame 60.

Figure 5:
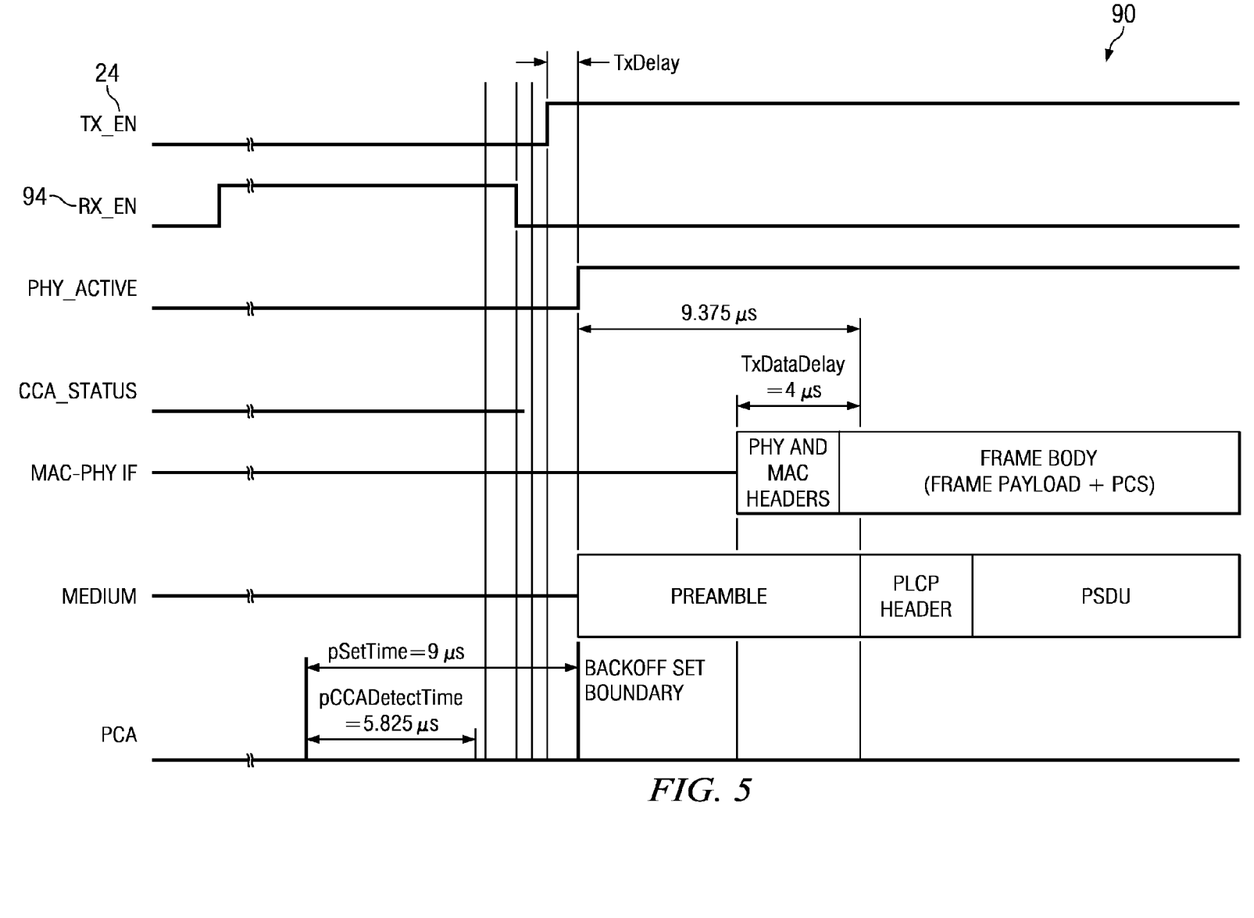
FIG. 5 is a wireless data transmission chart illustrating another embodiment of the present disclosure.

FIG. 5 is a transmission chart 90 of timing for a contention based transmission where one of the embodiments presently disclosed for increasing the MAC processing time may be implemented. In this example embodiment, the focus is on the timing for prioritized contention access (PCA) initiated transmission. At pCCADetectTime from the start of a backoff slot, the MAC checks a clear channel assessment (CCA) status signal provided by the PHY. If the signal is low indicating an idle medium status, the MAC decrements a backoff counter by one. If the value of the backoff counter reaches zero, the MAC must instruct the PHY to start transmitting the preamble of a frame at the end of the current backoff slot. To this end, the MAC must deassert RX_EN which was asserted to receive potential frames, and then assert TX_EN such that TxDelay 22 later the PHY starts the preamble transmission over the air—at the time when the current backoff slot ends. The MAC can continue preparing the header and body until TxDataDelay 20 before the preamble transmit has been completed. Without the need for making the header and body ready for the PHY at the time TX_EN is asserted, the MAC gains significant critical timing budget for putting the header and body together.

Figure 6:
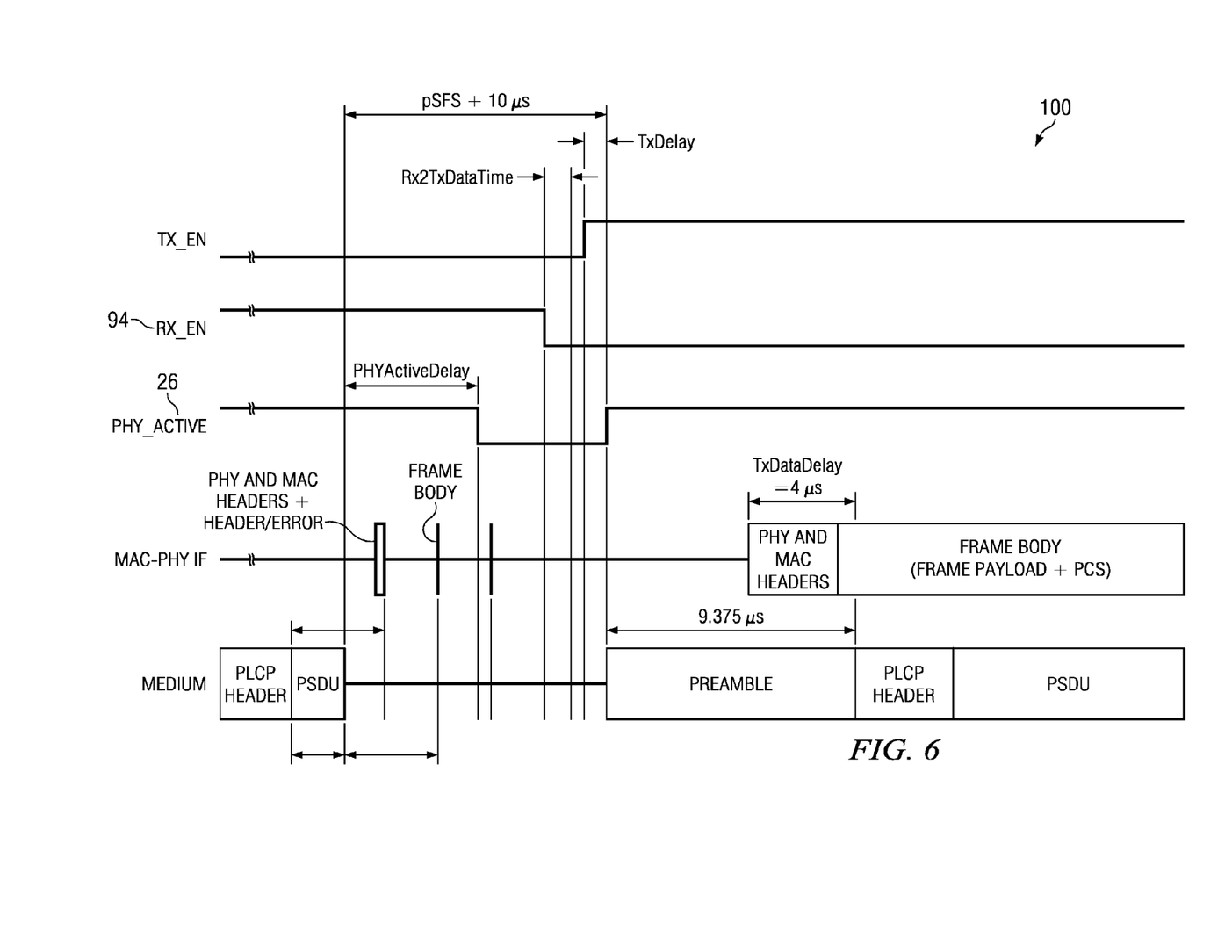
FIG. 6 is a wireless data transmission chart illustrating yet another embodiment of the present disclosure.

FIG. 6 is a transmission chart 100 of a block acknowledgement (B-ACK). In this example embodiment, the PHY needs to transmit a B-ACK frame a SIFS interval after the end of a received frame requesting a B-ACK frame from the addressed recipient. When a frame is received, the PHY decodes its PLCP header and delivers it to the MAC. The MAC parses the PLCP header which contains a PHY header and a MAC header, and finds that a B-ACK frame is requested as a response. The MAC deasserts RX_EN and then asserts TX_EN such that TxDelay later the PHY starts transmitting the preamble of the B-ACK response frame on the air—about SIFS after the end of the received frame on the air. The MAC proceeds to assemble the header and body of the B-ACK frame, and transfers the header, followed by the body, to the PHY TxDataDelay 20 before the end of the preamble on the air.

Figure 7:
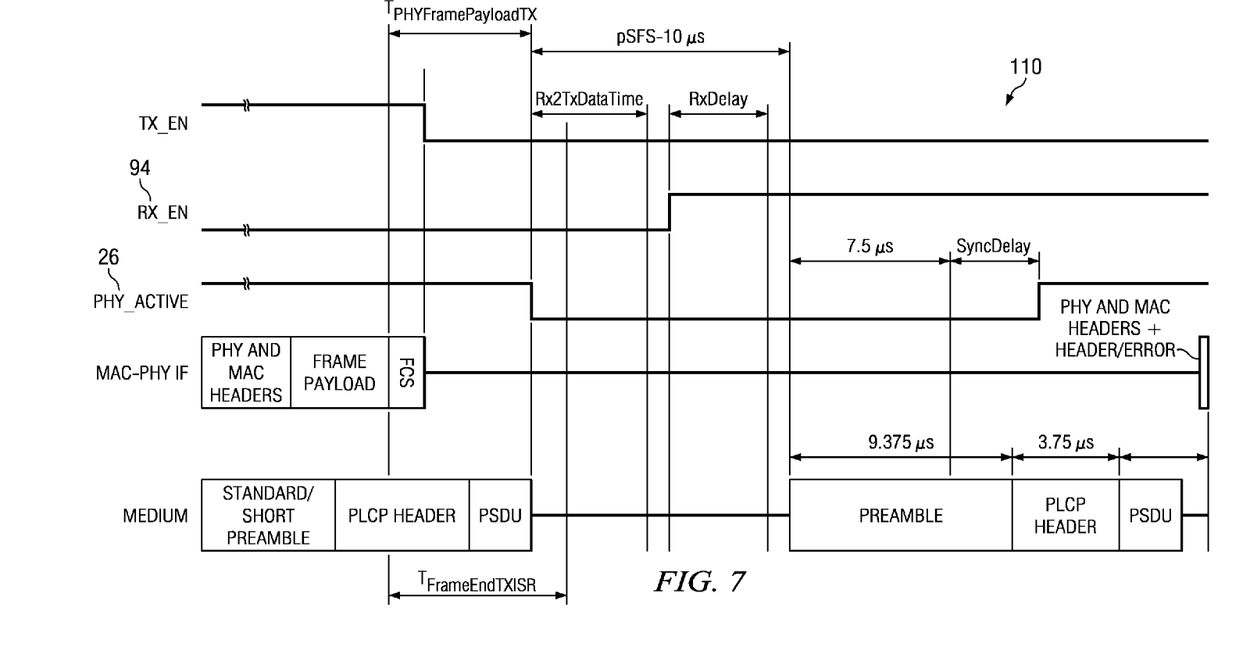
FIG. 7 is a wireless data transmission chart illustrating yet another embodiment of the present disclosure.

FIG. 7 is a transmission chart 110 of a frame following receipt of a B-ACK frame. In this example embodiment, the PHY needs to transmit a new frame or retransmit a previously transmitted frame a SIFS interval after the end of a received B-ACK frame providing positive or negative acknowledgment to the frames transmitted in an earlier block. When a frame is received, the PHY decodes its PLCP header and delivers it to the MAC. The MAC parses the PLCP header which contains a PHY header and a MAC header, and finds that a B-ACK frame is received and that old or new frames need to be sent. The MAC deasserts RX_EN, and then asserts TX_EN such that TxDelay later the PHY starts transmitting the preamble of the next frame on the air—about SIFS after the end of the received B-ACK frame on the air. The MAC proceeds to assemble the header and body of the next frame, and transfers the header, followed by the body, to the PHY TxDataDelay before the end of the preamble on the air.

Figure 8:
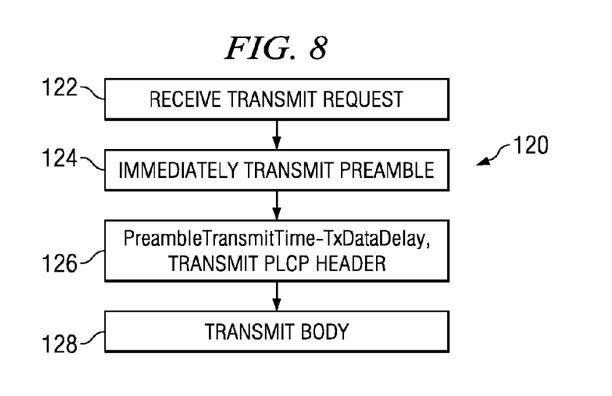
FIG. 8 is a flowchart of a method of responding to a transmit request as used in one embodiment of the present disclosure.

One method to increase the network efficiency 120 which can be used in any of the above embodiments is illustrated by FIG. 8. In this method, a transmit request is received (Block 122). After this transmit request is received, the preamble 12 of a response frame is transmitted (Block 124) by the PHY. Then the PLCP header of the frame is transferred from the MAC to the PHY, followed by the body, after a time period equal to (PreambleTransmitTime−TxDataDelay 20) elapses (Block 126). Finally, the body is transferred (Block 128). This method allows for the PLCP header to be ready and transfer to the PHY after (PreambleTransmitTime−TxDataDelay 20), thereby creating a window of time in which the MAC can assemble the needed information. One of the advantages of this method is that the window of time created by (PreambleTransmitTime−TxDataDelay 20) can be used to shorten the interval between the end of the data request frame and the start of the response frame on the air, and hence increase medium utilization and user throughput.

One example of where this type of method is used is in wireless communications such as wireless universal serial bus (USB). Wireless USB is a high speed method of communication that allows computer peripherals, such as a hard drive, scanner, or other computer peripheral, to be used by the computer without the need for a physical connection. Unlike similar standards, such as Bluetooth which can only transmit at 3 Mpbs, wireless USB boasts data throughout rates of up to 480 Mbps. With the increased speeds, the need for efficient medium utilization is especially important. By giving the MAC more control over the network transmission as well as reducing the processor requirements to transmit data, the inter-frame space between a packet sent by a wireless USB host and a packet sent by a wireless USB device as a response is kept to a minimum, thereby achieving high medium utilization efficiency. The disclosed systems and methods may be used in any high speed network, including wireless networks, networks which allow for the client to control a peripheral, and communication between clients.

Figure 9:
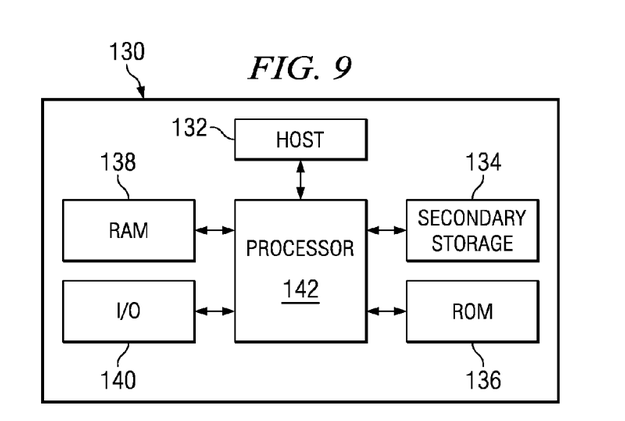
FIG. 9 illustrates an exemplary general-purpose computer system suitable for implementing the several embodiments of the disclosure.

The systems and methods described above may be implemented on any general-purpose computer with sufficient processing power, memory resources, and network throughput capability to handle the necessary workload placed upon it. FIG. 9 illustrates a typical, general-purpose computer system suitable for implementing one or more embodiments of a system to respond to signals as disclosed herein. The computer system 130 includes a processor 142 (which may be referred to as a central processor unit or CPU) that is in communication with memory devices including secondary storage 134, read only memory (ROM) 136, random access memory (RAM) 138, input/output (I/O) 140 devices, and host 132. The processor may be implemented as one or more CPU chips.

The secondary storage 134 is typically comprised of one or more disk drives or tape drives and is used for non-volatile storage of data and as an over-flow data storage device if RAM 138 is not large enough to hold all working data. Secondary storage 134 may be used to store programs that are loaded into RAM 138 when such programs are selected for execution. The ROM 136 is a non-volatile memory device that typically has a small memory capacity relative to the larger memory capacity of secondary storage. The RAM 138 is used to store volatile data and perhaps to store instructions. Access to both ROM 136 and RAM 138 is typically faster than to secondary storage 134.

I/O 140 devices may include printers, video monitors, liquid crystal displays (LCDs), touch screen displays, keyboards, keypads, switches, dials, mice, track balls, voice recognizers, card readers, paper tape readers, or other well-known input devices. Host 132 may interface to Ethernet cards, universal serial bus (USB), token ring cards, fiber distributed data interface (FDDI) cards, wireless local area network (WLAN) cards, and other well-known network devices. This host 132 may enable the processor 142 to communicate with an Internet or one or more intranets. With such a network connection, it is contemplated that the processor 142 might receive information from the network, or might output information to the network in the course of performing the above-described method steps.

The processor 142 executes instructions, codes, computer programs, scripts which it accesses from hard disk, floppy disk, optical disk (these various disk based systems may all be considered secondary storage 134), ROM 136, RAM 138, or the host 132.

Figure 10:
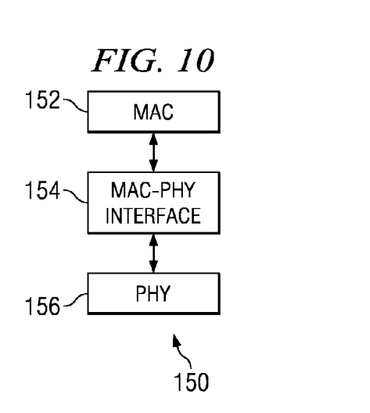
FIG. 10 illustrates an exemplary MAC, PHY, and MAC-PHY interface suitable for implementing the several embodiments of the disclosure.

The systems and methods described above may be implemented on devices with a MAC and a PHY. FIG. 10 illustrates an exemplary system 150 containing a MAC 152, a MAC-PHY interface 154, and a PHY 156. MAC 152 is capable, in this embodiment, of communicating with PHY 156 through MAC-PHY interface 154. MAC-PHY interface 154 may be a controller, processor, direct electrical connection, or any other system or method, logical or otherwise, that facilitates communication between MAC 152 and PHY 156. It is expressly understood that MAC 152, MAC-PHY interface 154, and PHY 156 may be implemented on a single electrical device, such as an integrated controller, or through the use of multiple electrical devices. It is further contemplated that MAC 152, MAC-PHY interface 154, and PHY 156 may be implemented through firmware on an embedded processor, or otherwise through software on a general purpose CPU, or may be implemented as hardware through the use of dedicated components, or a combination of the above choices. Any implementation of a device consistent with this disclosure containing a MAC and a PHY may contain a MAC-PHY interface. It is therefore expressly contemplated that the disclosed systems and methods may be used with any device with a MAC and a PHY.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system operable for network communication, comprising:
   a medium access control layer (MAC) operable to assert a signal to start a controlled wireless transmissions; and
   a physical layer (PHY) operable to use of a transmit delay (TxDelay) interval and a transmit data delay (TxDataDelay) in the controlled wireless data transmission and to transmit a first part of a response frame comprising preamble [of a response frame, while] without a second part of the frame from the medium access control layer, while the MAC continues data preparation for a header contained with the second part of the frame and a frame body and wherein the physical layer is further operable to transmit the second part of the frame in response to receiving the second part of the frame from the medium access control layer, wherein a time from transmission of the first part of the frame by the physical layer to transmission of the second part of the frame by the medium access control layer is adjustable based upon processing timing requirements, wherein the MAC is required to have the header ready for the PHY only within TxDataDelay of the end of the preamble on the air, wherein the TxDataDelay is a time interval from when the PHY is allowed to start requesting data from the MAC to when the transmission of the preamble ends over the air.

2. The system of claim 1, further comprising a layer interface operable to facilitate communication between the medium access control layer and the physical layer, wherein the layer interface is selected from the group of: a ultra-wideband interface, a WiMedia interface, a wireless universal serial bus, a IEEE 1394 interface, and a wireless LAN interface.

3. The system of claim 1, where interframe spacing is decreased by increasing the time interval between transmitting the first part of the frame by the physical layer and transferring the second part of the frame by the medium control access layer to the physical layer.

4. The system of claim 1, wherein the header is a physical layer convergence procedure (PLCP) header and a frame body.

5. The system of claim 3, wherein the interframe spacing is determined by the physical layer to be a minimum time required by the medium access control layer to obtain control over the transmission.

6. A method for network communications, comprising:
   receiving a transmit request;
   using a transmit delay (TxDelay) interval and a transmit data delay (TxDataDelay) in controlled wireless data transmissions;
   transmitting a first part of a response comprising a preamble by a physical layer (PHY) without a second part of the response from a medium access control layer (MAC), while the MAC continues data preparation for physical layer convergence procedure (PLCP) headers contained within the second part of the response and a frame body;
   requesting the second part of the response from the medium access control layer; and
   transmitting the second part of the response by the physical layer with data from the medium access control layer (MAC), wherein a time from transmission of the preamble by the physical layer to transmission of the PLCP header by the medium access control layer is adjustable based upon processing timing requirements; wherein the MAC is required to have the header ready for the PHY only within the TxDataDelay of the end of the preamble on the air, wherein the TxDataDelay is a time interval from when the PHY is allowed to start requesting data from the MAC to when the transmission of the preamble ends over the air.

7. The method of claim 6, wherein the transmit request is transmitted in a burst mode.

8. The method of claim 6, wherein the physical layer maximizes a TxDataDelay value.

9. The method of claim 6, wherein the transmit request is made over an ultra wideband network.

10. A transceiver system, comprising:
    a medium access control layer physical layer interface operable to facilitate communication between a medium access control layer (MAC) and a physical layer (PHY) operable to adjust a length of time between the transmission of the first and second parts of [the frame] a response frame to meet processing timing requirements; and
    a transmitter operable [to] to use of a transmit delay (TxDelay) interval and a transmit data delay (TxDataDelay) in controlled wireless data transmissions and to communicate with the physical layer and operable to communicate with a plurality of network devices and pass network communications to the physical layer, and wherein the physical layer is operable to transmit [a first partpreamble of a response frame] the first part of the response frame comprising preamble frame through the transmitter to the plurality of network devices without the second part of the frame from the medium access control layer, while the MAC continues data preparation for a header contained with the second part of the frame and a frame body, wherein the MAC is required to have the header ready for the PHY only within the TxDataDelay of the end of the preamble on the air, wherein the TxDataDelay is a time interval from when the PHY is allowed to start requesting data from the MAC to when the transmission of the preamble ends over the air.

11. The system of claim 10, wherein the header is a physical layer convergence procedure (PLCP) header.

12. The system of claim 11, wherein the PLCP header and the frame body are sent non-contiguously.

* * * * *